United States Patent
Mudalige et al.

(12) 
(10) Patent No.: US 10,073,456 B2
(45) Date of Patent: Sep. 11, 2018

(54) AUTOMATED CO-PILOT CONTROL FOR AUTONOMOUS VEHICLES

(71) Applicant: GM GLOBAL TECHNOLOGY OPERATIONS LLC, Detroit, MI (US)

(72) Inventors: Upali P. Mudalige, Oakland Township, MI (US); Padma Sundaram, West Bloomfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 64 days.

(21) Appl. No.: 15/353,842

(22) Filed: Nov. 17, 2016

(65) Prior Publication Data

US 2018/0136660 A1    May 17, 2018

(51) Int. Cl.
*G05D 1/02* (2006.01)
*B60R 16/023* (2006.01)

(52) U.S. Cl.
CPC .................... *G05D 1/021* (2013.01)

(58) Field of Classification Search
None
See application file for complete search history.

(56) References Cited

U.S. PATENT DOCUMENTS

| | | | |
|---|---|---|---|
| 2005/0021201 A1* | 1/2005 | Klotz | B60W 30/16 702/189 |
| 2011/0169951 A1* | 7/2011 | Claxton | G06K 9/6293 348/143 |
| 2015/0239482 A1* | 8/2015 | Green | B61L 15/0063 246/122 R |
| 2016/0103450 A1* | 4/2016 | Hogenmueller | G05D 1/0077 701/23 |

* cited by examiner

*Primary Examiner* — Todd M Melton
*Assistant Examiner* — Jason R Roberson

(57) ABSTRACT

A control system for an autonomous vehicle includes at least one controller. The controller is programmed to receive first sensor readings from a first group of sensors, provide a first sensor fusion output based on the first sensor readings, the first sensor fusion output including a first detected state of a detected object, receive second sensor readings from a second group of sensors, and provide a second sensor fusion output based on the second sensor readings, the second sensor fusion output including a second detected state of the detected object. The controller is additionally programmed to, in response to the first detected state being outside a predetermined range of the second detected state, generate a diagnostic signal.

15 Claims, 4 Drawing Sheets

AUTOMATED CO-PILOT CONTROL FOR AUTONOMOUS VEHICLES

TECHNICAL FIELD

The present disclosure relates to vehicles controlled by automated driving systems, particularly those configured to automatically control vehicle steering, acceleration, and braking during a drive cycle without human intervention.

INTRODUCTION

The operation of modern vehicles is becoming more automated, i.e. able to provide driving control with less and less driver intervention. Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

SUMMARY

An automotive vehicle according to the present disclosure includes a plurality of sensors configured to detect external features in the vicinity of the automotive vehicle. The vehicle additionally includes an actuator configured to control vehicle steering, acceleration, braking, or shifting. The vehicle further includes at least one controller. The controller is in electronic communication with respective sensors of the plurality of sensors and the actuator. The controller is programmed with an automated driving system (ADS) control algorithm and configured to automatically control the actuator based on the ADS control algorithm. The ADS control algorithm includes a first sensor fusion algorithm configured to receive first sensor readings from a first group of respective sensors of the plurality of sensors and provide a first sensor fusion output based on the first sensor readings. The first sensor fusion output includes a first detected state of a detected object. The ADS control algorithm additionally includes a second sensor fusion algorithm configured to receive second sensor readings from a second group of respective sensors of the plurality of sensors and provide a second sensor fusion output based on the second sensor readings. The second sensor fusion output includes a second detected state of the detected object. The ADS control algorithm further includes a sensor fusion arbitration algorithm configured to, in response to the first detected state being outside a predetermined range of the second detected state, generate a diagnostic signal.

In an exemplary embodiment, the first detected state includes a first detected position, first detected velocity, and first detected acceleration of the detected object, and the second detected state includes a second detected position, second detected velocity, and second detected acceleration of the detected object.

In an exemplary embodiment, the diagnostic signal includes a parameter representative of a difference between the first detected state and the second detected state.

In an exemplary embodiment, the at least one controller is further programmed to, in response to the diagnostic signal, control the actuator according to a fall back command.

In an exemplary embodiment, the at least one controller includes a first controller and a second controller, the first controller being programmed with the first sensor fusion algorithm and the second controller being programmed with the second sensor fusion algorithm.

In an exemplary embodiment, the first group of respective sensors includes a respective sensor which is not among the second group of respective sensors.

A method of controlling a vehicle according to the present disclosure includes providing the vehicle with a plurality of sensors configured to detect external features in the vicinity of the vehicle. The method also includes providing the vehicle with an actuator configured to control vehicle steering, throttle, braking, or shifting. The method additionally includes providing the vehicle with at least one controller in electronic communication with respective sensors of the plurality of sensors and the actuator. The at least one controller is programmed with an automated driving control system algorithm. The method further includes receiving, via the at least one controller, first sensor readings from a first group of respective sensors of the plurality of sensors, and determining, via the at least one controller, a first sensor fusion output based on the first sensor readings. The first sensor fusion output includes a first detected state of a detected object. The method additionally includes receiving, via the at least one controller, second sensor readings from a second group of respective sensors of the plurality of sensors, and determining, via the at least one controller, a second sensor fusion output based on the second sensor readings. The second sensor fusion output includes a second detected state of a detected object. The method further includes, in response to the first detected state being outside a predetermined range of the second detected state, automatically generating a diagnostic signal.

In an exemplary embodiment, the first detected state includes a first detected position, first detected velocity, and first detected acceleration of the detected object, and wherein the second detected state includes a second detected position, second detected velocity, and second detected acceleration of the detected object.

In an exemplary embodiment, the diagnostic signal includes a parameter representative of a difference between the first detected state and the second detected state.

In an exemplary embodiment, the method additionally includes, in response to the diagnostic signal, automatically control the actuator according to a fall back command.

In an exemplary embodiment, providing the vehicle with at least one controller includes providing the vehicle with a first controller and a second controller. In such embodiments, receiving first sensor readings is performed via the first controller, determining a first fusion output is performed via the first controller, receiving second sensor readings is performed via the second controller, and determining a second fusion output is performed via the second controller.

In an exemplary embodiment, the first group of respective sensors includes a respective sensor which is not among the second group of respective sensors.

A control system for a vehicle according to the present disclosure includes at least one controller. The controller is programmed to receive first sensor readings from a first group of sensors, provide a first sensor fusion output based on the first sensor readings, the first sensor fusion output including a first detected state of a detected object, receive second sensor readings from a second group of sensors, and provide a second sensor fusion output based on the second sensor readings, the second sensor fusion output including a second detected state of the detected object. The controller is additionally programmed to, in response to the first detected state being outside a predetermined range of the second detected state, generate a diagnostic signal.

In an exemplary embodiment, the first detected state includes a first detected position, first detected velocity, and first detected acceleration of the detected object, and wherein the second detected state includes a second detected position, second detected velocity, and second detected acceleration of the detected object.

In an exemplary embodiment, the diagnostic signal includes a parameter representative of a difference between the first detected state and the second detected state.

In an exemplary embodiment, the at least one controller is further programmed to, in response to the diagnostic signal, control at least one actuator according to a fall back command.

In an exemplary embodiment, the at least one controller is further programmed to, in response to no diagnostic signal being generated, control at least one actuator according to an automated driving algorithm.

In an exemplary embodiment, the first group of sensors includes a respective sensor which is not among the second group of sensors.

Embodiments according to the present disclosure provide a number of advantages. For example, embodiments according to the present disclosure may enable independent validation of autonomous vehicle sensor readings to aid in diagnosis of software or hardware conditions in the sensors and controllers. Embodiments according to the present disclosure may thus be more robust, increasing customer satisfaction.

The above advantage and other advantages and features of the present disclosure will be apparent from the following detailed description of the preferred embodiments when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
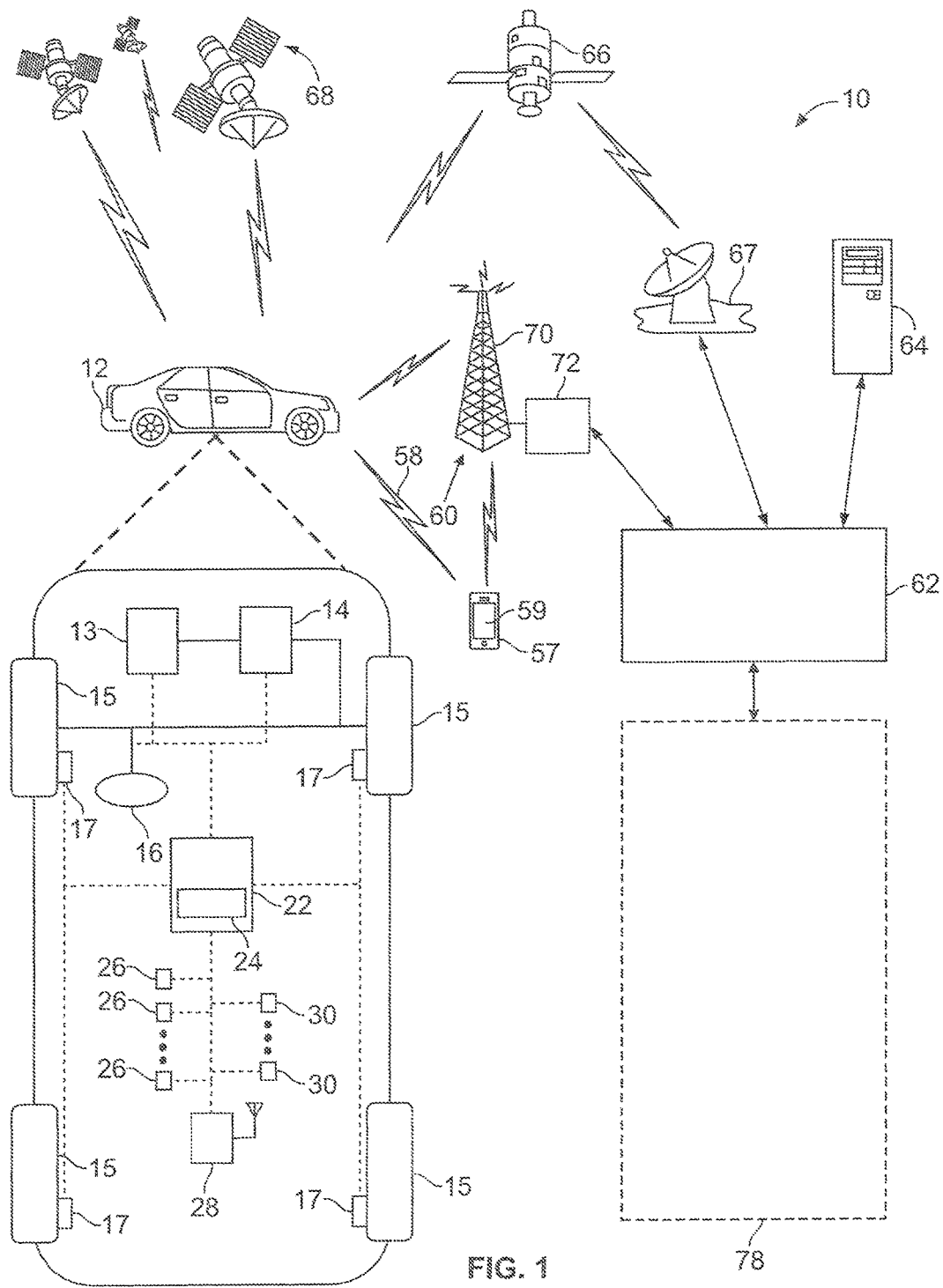
FIG. 1 is a schematic diagram of a communication system including an autonomously controlled vehicle, according to an embodiment.

FIG. 1 schematically illustrates an operating environment that comprises a mobile vehicle communication and control system 10 for a motor vehicle 12. The communication and control system 10 for the vehicle 12 generally includes one or more wireless carrier systems 60, a land communications network 62, a computer 64, a networked wireless device 57 including but not limited to a smart phone, tablet, or wearable device such as a watch, and a remote access center 78.

The vehicle 12, shown schematically in FIG. 1, includes a propulsion system 13, which may in various embodiments include an internal combustion engine, an electric machine such as a traction motor, and/or a fuel cell propulsion system. Vehicle 12 is depicted in the illustrated embodiment as a passenger car, but it should be appreciated that any other vehicle including motorcycles, trucks, buses, sport utility vehicles (SUVs), recreational vehicles (RVs), marine vessels, aircraft, etc., can also be used.

The vehicle 12 also includes a transmission 14 configured to transmit power from the propulsion system 13 to a plurality of vehicle wheels 15 according to selectable speed ratios. According to various embodiments, the transmission 14 may include a step-ratio automatic transmission, a continuously-variable transmission, or other appropriate transmission. The vehicle 12 additionally includes wheel brakes 17 configured to provide braking torque to the vehicle wheels 15. The wheel brakes 17 may, in various embodiments, include friction brakes, a regenerative braking system such as an electric machine, and/or other appropriate braking systems.

The vehicle 12 additionally includes a steering system 16. While depicted as including a steering wheel for illustrative purposes, in some embodiments contemplated within the scope of the present disclosure, the steering system 16 may not include a steering wheel.

The vehicle 12 includes a wireless communications system 28 configured to wirelessly communicate with other vehicles ("V2V") and/or infrastructure ("V2I"). In an exemplary embodiment, the wireless communication system 28 is configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The propulsion system 13, transmission 14, steering system 16, and wheel brakes 17 are in communication with or under the control of at least one controller 22. While depicted as a single unit for illustrative purposes, the controller 22 may additionally include one or more other controllers, collectively referred to as a "controller." The controller 22 may include a microprocessor such as a central processing unit (CPU) or graphics processing unit (GPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 22 in controlling the vehicle.

The controller 22 includes an automated driving system (ADS) 24 for automatically controlling various actuators in the vehicle. In an exemplary embodiment, the ADS 24 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. In an exemplary embodiment, the ADS 24 is configured to control the propulsion system 13, transmission 14, steering system 16, and wheel brakes 17 to control vehicle acceleration, steering, and braking, respectively, without human intervention via a plurality of actuators 30 in response to inputs from a plurality of sensors 26, which may include GPS, RADAR, LiDAR, optical cameras, thermal cameras, ultrasonic sensors, and/or additional sensors as appropriate.

FIG. 1 illustrates several networked devices that can communicate with the wireless communication system 28 of the vehicle 12. One of the networked devices that can communicate with the vehicle 12 via the wireless communication system 28 is the networked wireless device 57. The networked wireless device 57 can include computer processing capability, a transceiver capable of communicating using a short-range wireless protocol, and a visual display 59. The computer processing capability includes a microprocessor in the form of a programmable device that includes one or more instructions stored in an internal memory structure and applied to receive binary input to create binary output. In some embodiments, the networked wireless device 57 includes a GPS module capable of receiving GPS satellite signals and generating GPS coordinates based on those signals. In other embodiments, the networked wireless device 57 includes cellular communications functionality such that the networked wireless device 57 carries out voice and/or data communications over the wireless carrier system 60 using one or more cellular communications protocols, as are discussed herein. The visual display 59 may also include a touch-screen graphical user interface.

The wireless carrier system 60 is preferably a cellular telephone system that includes a plurality of cell towers 70 (only one shown), one or more mobile switching centers (MSCs) 72, as well as any other networking components required to connect the wireless carrier system 60 with the land communications network 62. Each cell tower 70 includes sending and receiving antennas and a base station, with the base stations from different cell towers being connected to the MSC 72 either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from using the wireless carrier system 60, a second wireless carrier system in the form of satellite communication can be used to provide uni-directional or bi-directional communication with the vehicle 12. This can be done using one or more communication satellites 66 and an uplink transmitting station 67. Uni-directional communication can include, for example, satellite radio services, wherein programming content (news, music, etc.) is received by the transmitting station 67, packaged for upload, and then sent to the satellite 66, which broadcasts the programming to subscribers. Bi-directional communication can include, for example, satellite telephony services using the satellite 66 to relay telephone communications between the vehicle 12 and the station 67. The satellite telephony can be utilized either in addition to or in lieu of the wireless carrier system 60.

The land network 62 may be a conventional land-based telecommunications network connected to one or more landline telephones and connects the wireless carrier system 60 to the remote access center 78. For example, the land network 62 may include a public switched telephone network (PSTN) such as that used to provide hardwired telephony, packet-switched data communications, and the Internet infrastructure. One or more segments of the land network 62 could be implemented through the use of a standard wired network, a fiber or other optical network, a cable network, power lines, other wireless networks such as wireless local area networks (WLANs), or networks providing broadband wireless access (BWA), or any combination thereof. Furthermore, the remote access center 78 need not be connected via land network 62, but could include wireless telephony equipment so that it can communicate directly with a wireless network, such as the wireless carrier system 60.

While shown in FIG. 1 as a single device, the computer 64 may include a number of computers accessible via a private or public network such as the Internet. Each computer 64 can be used for one or more purposes. In an exemplary embodiment, the computer 64 may be configured as a web server accessible by the vehicle 12 via the wireless communication system 28 and the wireless carrier 60. Other computers 64 can include, for example: a service center computer where diagnostic information and other vehicle data can be uploaded from the vehicle via the wireless communication system 28 or a third party repository to or from which vehicle data or other information is provided, whether by communicating with the vehicle 12, the remote access center 78, the networked wireless device 57, or some combination of these. The computer 64 can maintain a searchable database and database management system that permits entry, removal, and modification of data as well as the receipt of requests to locate data within the database. The computer 64 can also be used for providing Internet connectivity such as DNS services or as a network address server that uses DHCP or other suitable protocol to assign an IP address to the vehicle 12.

Figure 2:
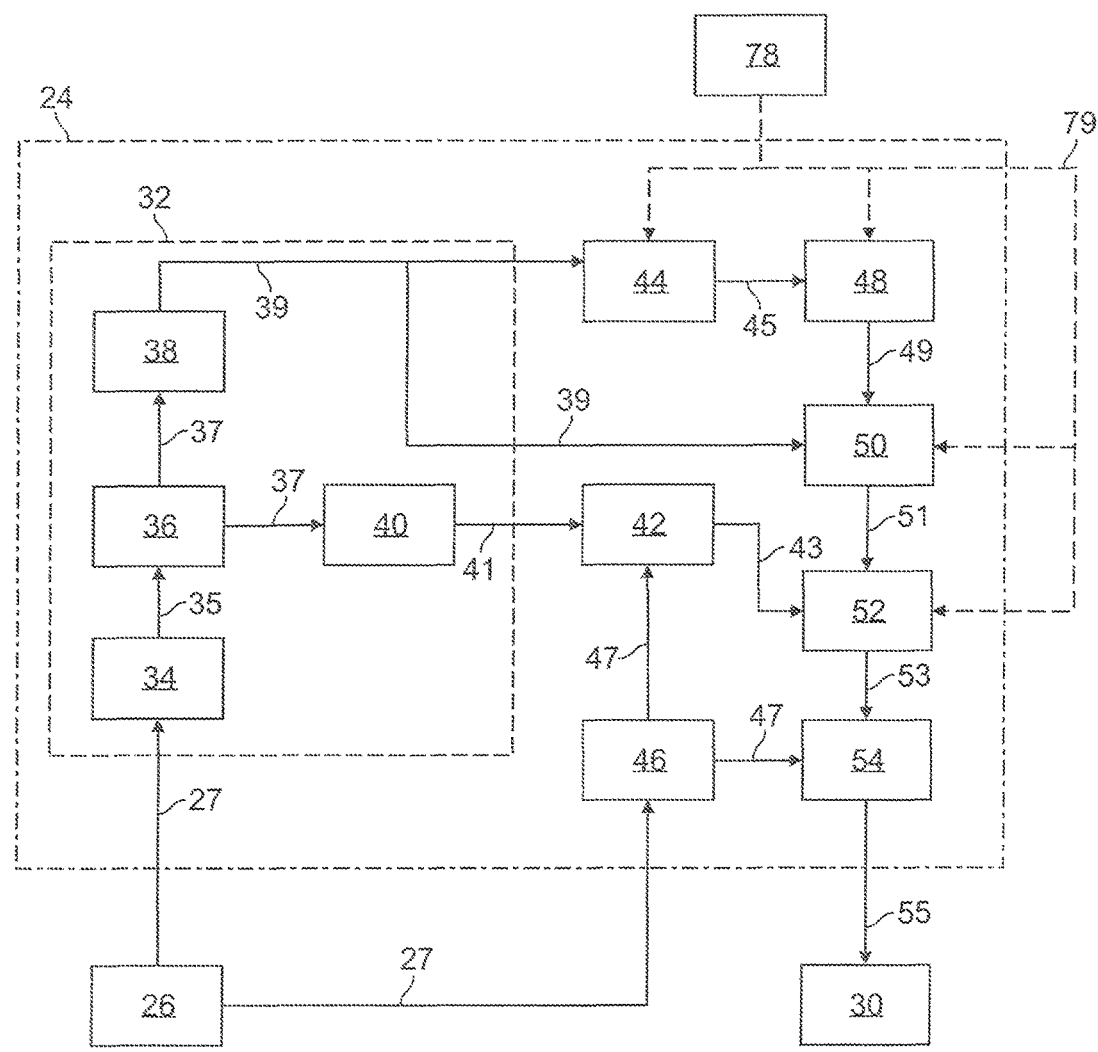
FIG. 2 is a schematic block diagram of an automated driving system (ADS) for a vehicle, according to an embodiment.

As shown in FIG. 2, the ADS 24 includes multiple distinct control systems, including at least a perception system 32 for determining the presence, location, classification, and path of detected features or objects in the vicinity of the vehicle. The perception system 32 is configured to receive inputs from a variety of sensors, such as the sensors 26 illustrated in FIG. 1, and synthesize and process the sensor inputs to generate parameters used as inputs for other control algorithms of the ADS 24.

The perception system 32 includes a sensor fusion and preprocessing module 34 that processes and synthesizes sensor data 27 from the variety of sensors 26. The sensor fusion and preprocessing module 34 performs calibration of the sensor data 27, including, but not limited to, LiDAR to LiDAR calibration, camera to LiDAR calibration, LiDAR to chassis calibration, and LiDAR beam intensity calibration. The sensor fusion and preprocessing module 34 outputs preprocessed sensor output 35.

A classification and segmentation module 36 receives the preprocessed sensor output 35 and performs object classification, image classification, traffic light classification, object segmentation, ground segmentation, and object tracking processes. Object classification includes, but is not limited to, identifying and classifying objects in the surrounding environment including identification and classification of traffic signals and signs, RADAR fusion and tracking to account for the sensor's placement and field of view (FOV), and false positive rejection via LiDAR fusion to eliminate the many false positives that exist in an urban environment, such as, for example, manhole covers, bridges, overhead trees or light poles, and other obstacles with a high RADAR cross section but which do not affect the ability of the vehicle to travel along its path. Additional object classification and tracking processes performed by the classification and segmentation model 36 include, but are not limited to, freespace detection and high level tracking that fuses data from RADAR tracks, LiDAR segmentation, LiDAR classification, image classification, object shape fit models, semantic information, motion prediction, raster maps, static obstacle maps, and other sources to produce high quality object tracks.

The classification and segmentation module 36 additionally performs traffic control device classification and traffic control device fusion with lane association and traffic control device signal phase and timing models. The classification and segmentation module 36 generates an object classification and segmentation output 37 that includes object identification information.

A localization and mapping module 40 uses the object classification and segmentation output 37, along with other inputs (e.g. GPS and mapping data) to calculate parameters including, but not limited to, estimates of the position and orientation of vehicle 12 in both typical and challenging driving scenarios. These challenging driving scenarios include, but are not limited to, dynamic environments with many cars (e.g., dense traffic), challenging weather (e.g. rain, light snow), environments with large scale obstructions (e.g., roadwork or construction sites), hills, multi-lane roads, single lane roads, a variety of road markings and buildings or lack thereof (e.g., residential vs. business districts), and bridges and overpasses (both above and below a current road segment of the vehicle).

The localization and mapping module 40 also incorporates new data collected as a result of expanded map areas obtained via onboard mapping functions performed by the vehicle 12 during operation and mapping data "pushed" to the vehicle 12 via the wireless communication system 28. The localization and mapping module 40 updates previous map data with the new information (e.g., new lane markings, new building structures, addition or removal of constructions zones, etc.) while leaving unaffected map regions unmodified. Examples of map data that may be generated or updated include, but are not limited to, yield line categorization, lane boundary generation, lane connection, classification of minor and major roads, classification of left and right turns, and intersection lane creation.

In some embodiments, the localization and mapping module 40 uses Simultaneous Localization and Mapping ("SLAM") techniques to develop maps of the surrounding environment. SLAM techniques construct a map of an environment and track an object's position within the environment. GraphSLAM, a variant of SLAM, employs sparse matrices which are used to produce a graph containing observation interdependencies.

Object position within a map is represented by a Gaussian probability distribution centered around the object's predicted path. SLAM in its simplest form utilizes three constraints: an initial location constraint; a relative motion constraint, which is the object's path; and a relative measurement constraint, which is one or more measurements of an object to a landmark.

The initial motion constraint is the initial pose (e.g., position and orientation) of the vehicle, which consists of the vehicle's position in two or three dimensional space including pitch, roll, and yaw data. The relative motion constraint is the displaced motion of the object which contains a degree of flexibility to accommodate map consistency. The relative measurement constraint includes one or more measurements from the object sensors to a landmark. The initial location constraint, the relative motion constraint, and the relative measurement constraint are typically Gaussian probability distributions. Object locating methods within a sensor-generated map may employ Kalman filters, various statistical correlation methods such as the Pearson product-moment correlation, and/or particle filters.

In some embodiments, once a map is built, vehicle localization is achieved in real time via a particle filter. Particle filters, unlike Bayes or Kalman filters, accommodate non-linear systems. To locate a vehicle, particles are generated around an expected mean value via a Gaussian probability distribution. Each particle is assigned a numerical weight representing the accuracy of the particle position to the predicted position. Sensor data is taken into account and the particle weights are adjusted to accommodate the sensor data. The closer the proximity of the particle to the sensor adjusted position, the greater the numerical value of the particle weights.

As an action command occurs, each particle is updated to a new predicted position. Sensor data is observed at the new predicted position and each particle is assigned a new weight representing the accuracy of the particle position with respect to the predicted position and sensor data. The particles are re-sampled, selecting the weights that have the most numerical magnitude, thus increasing the accuracy of the predicted and sensor-corrected object position. Typically the mean, variance, and standard deviation of the resampled data provides the new object position likelihood.

Particle filter processing is expressed as:

$$P(H_t|H_{t-1}, A_t, D_t) \qquad \text{Equation 1}$$

where $H_t$ is the current hypothesis, which is the object position. $H_{t-1}$ is the previous object position, $A_t$ is the action, which is typically a motor command, and $D_t$ is the observable data.

In some embodiments, the localization and mapping module 40 maintains an estimate of the vehicle's global position by incorporating data from multiple sources as discussed above in an Extended Kalman Filter (EKF) framework. Kalman filters are linear filters based on Recursive Bayesian Filters. Recursive Bayesian Filters, also referred to as Recursive Bayesian Estimation, essentially substitute the posterior of an estimation into the prior position to calculate a new posterior on a new estimation iteration. This effectively yields:

$$P(H_t|H_{t-1},D_t) \quad \text{Equation 2}$$

where the probability of a hypothesis $H_t$ is estimated by the hypothesis at the previous iteration $H_{t-1}$ and the data $D_t$ at current time t.

A Kalman filter adds an action variable $A_t$ where t is a time iteration, yielding:

$$P(H_t|H_{t-1},A_t,D_t) \quad \text{Equation 3}$$

where the probability of a hypothesis $H_t$ is based on the previous hypothesis $H_{t-1}$, an action $A_t$, and data $D_t$ at current time t.

A Kalman filter estimates a current position, which is a joint probability distribution, and based on an action command predicts a new position which is also a joint probability distribution, called a state prediction. Sensor data is acquired and a separated joint probability distribution is calculated, called a sensor prediction.

State prediction is expressed as:

$$X'_t = AX_{t-1} + B\mu + \varepsilon_t \quad \text{Equation 4}$$

where $X'_t$ is a new state based on the previous state $AX_{t-1}$, $B\mu$, and $\xi_t$. Constants A and B are defined by the physics of interest, $\mu$ may be a robotic motor command, and $\xi_t$ is a Gaussian state error prediction.

Sensor prediction is expressed as:

$$Z'_t = CX_t + \varepsilon_z \quad \text{Equation 5}$$

where $Z'_t$ is the new sensor estimate, C is a function and $\xi_z$ is a Gaussian sensor error prediction.

A new predicted state estimate is expressed as:

$$X_{EST} = X'_t + K(Z_t - Z'_t) \quad \text{Equation 6}$$

where the product $K(Z_t - Z'_t)$ is referred to as the Kalman gain factor. If the difference between the sensor prediction $Z'_t$ and the actual sensor data $Z_t$ (that is, $Z_t - Z'_t$) is reasonably close to zero, then $X'_t$ is considered to be the new state estimate. If $Z_t - Z'_t$ is reasonably larger than zero, the $K(Z_t - Z'_t)$ factor is added to yield a new state estimate.

As vehicle movement information is received, the EKF updates the vehicle position estimate while also expanding the estimate covariance. Once the sensor covariance is integrated into the EKF, the localization and mapping module 40 generates a localization and mapping output 41 that includes the position and orientation of the vehicle 12 with respect to detected obstacles and road features.

A vehicle odometry module 46 receives data 27 from the vehicle sensors 26 and generates a vehicle odometry output 47 which includes, for example, vehicle heading, velocity, and distance information. An absolute positioning module 42 receives the localization and mapping output 41 and the vehicle odometry information 47 and generates a vehicle location output 43 that is used in separate calculations as discussed below.

An object prediction module 38 uses the object classification and segmentation output 37 to generate parameters including, but not limited to, a location of a detected obstacle relative to the vehicle, a predicted path of the detected obstacle relative to the vehicle, and a location and orientation of traffic lanes relative to the vehicle. Bayesian models may be used in some embodiments to predict driver or pedestrian intent based on semantic information, previous trajectory, and instantaneous pose, where pose is the combination of the position and orientation of an object.

Bayes' Theorem, also referred to as a Bayesian filter, is a form of conditional probability. Bayes' Theorem, shown below in Equation 7, sets forth the proposition that the probability of a hypothesis H, given data D, is equal to the probability of a hypothesis H times the likelihood of the data D given the hypothesis H, divided by the probability of the data P(D).

$$P(H|D) = \frac{P(H)\ P(D|H)}{P(D)} \quad \text{Equation 7}$$

P(H/D) is referred to as the posterior and P(H) is referred to as the prior. Bayes' Theorem measures a probabilistic degree of belief in a proposition before (the prior) and after (the posterior) accounting for evidence embodied in the data, D. Bayes' Theorem may be used recursively when iterated. On each new iteration, the previous posterior becomes the prior to produce a new posterior until the iteration is complete. Data on the predicted path of objects (including pedestrians, surrounding vehicles, and other moving objects) is output as an object prediction output 39 and is used in separate calculations as discussed below.

The ADS 24 also includes an observation module 44 and an interpretation module 48. The observation module 44 generates an observation output 45 received by the interpretation module 48. The observation module 44 and the interpretation module 48 allow access by the remote access center 78. The interpretation module 48 generates an interpreted output 49 that includes additional input provided by the remote access center 78.

A path planning module 50 processes and synthesizes the object prediction output 39, the interpreted output 49, and additional routing information 79 received from an online database or the remote access center 78 to determine a vehicle path to be followed to maintain the vehicle on the desired route while obeying traffic laws and avoiding any detected obstacles. The path planning module 50 employs algorithms configured to avoid any detected obstacles in the vicinity of the vehicle, maintain the vehicle in a current traffic lane, and maintain the vehicle on the desired route. The path planning module 50 uses pose-graph optimization techniques, including non-linear least square pose-graph optimization, to optimize the map of car vehicle trajectories in six degrees of freedom and reduce path errors. The path planning module 50 outputs the vehicle path information as path planning output 51. The path planning output 51 includes a commanded vehicle path based on the vehicle route, vehicle location relative to the route, location and orientation of traffic lanes, and the presence and path of any detected obstacles.

A first control module 52 processes and synthesizes the path planning output 51 and the vehicle location output 43 to generate a first control output 53. The first control module 52 also incorporates the routing information 79 provided by the remote access center 78 in the case of a remote take-over mode of operation of the vehicle.

A vehicle control module 54 receives the first control output 53 as well as velocity and heading information 47 received from vehicle odometry 46 and generates vehicle control output 55. The vehicle control output 55 includes a set of actuator commands to achieve the commanded path from the vehicle control module 54, including, but not limited to, a steering command, a shift command, a throttle command, and a brake command.

The vehicle control output 55 is communicated to actuators 30. In an exemplary embodiment, the actuators 30 include a steering control, a shifter control, a throttle control, and a brake control. The steering control may, for example, control a steering system 16 as illustrated in FIG. 1. The shifter control may, for example, control a transmission 14 as illustrated in FIG. 1. The throttle control may, for example, control a propulsion system 13 as illustrated in FIG. 1. The brake control may, for example, control wheel brakes 17 as illustrated in FIG. 1.

It should be understood that the disclosed methods can be used with any number of different systems and is not specifically limited to the operating environment shown here. The architecture, construction, setup, and operation of the system 10 and its individual components is generally known. Other systems not shown here could employ the disclosed methods as well.

Figure 3:
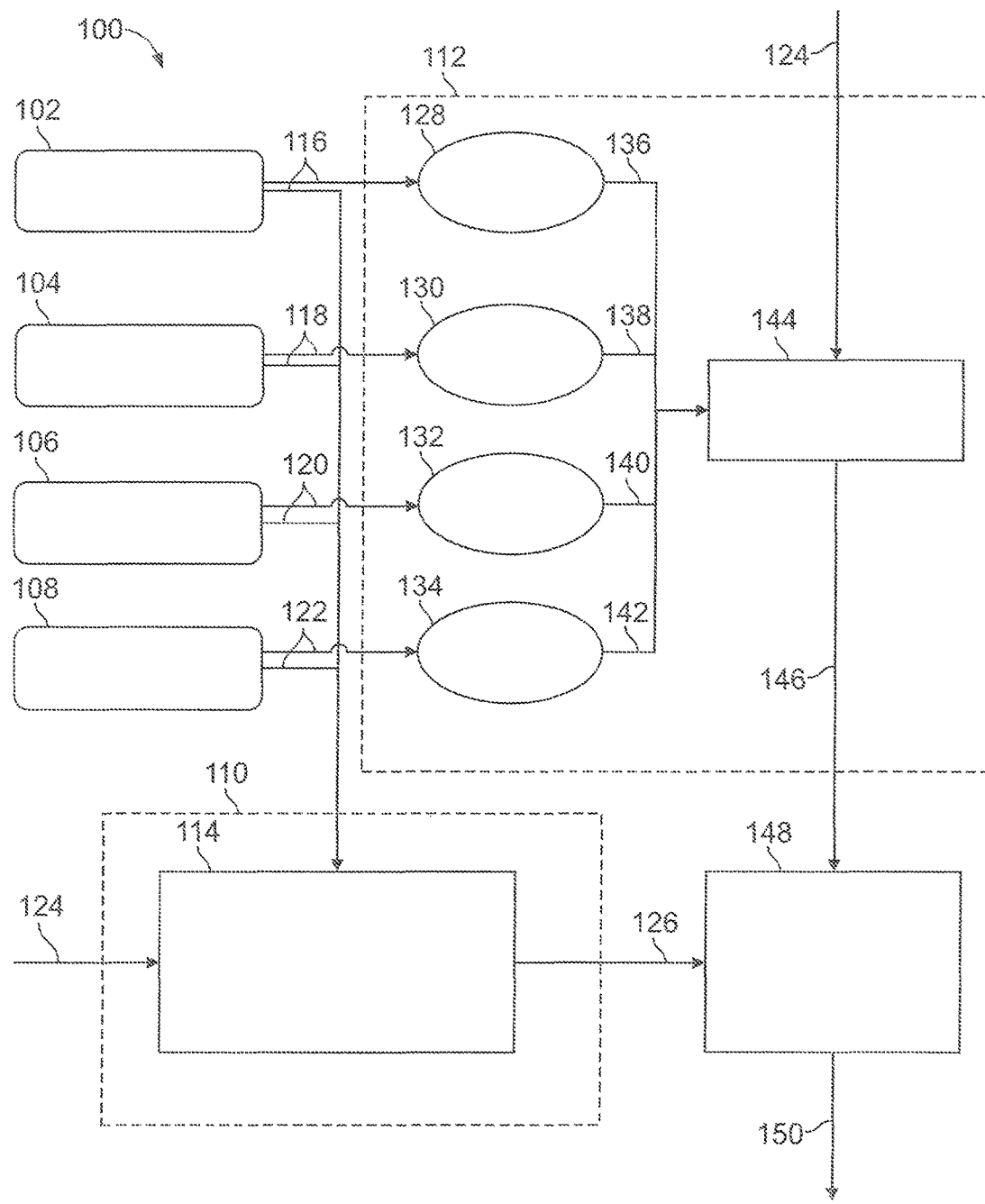
FIG. 3 is a schematic block diagram of a sensor fusion system according to an embodiment of the present disclosure.

Referring now to FIG. 3, an exemplary embodiment of a sensor fusion system 100 according to the present disclosure is illustrated. The sensor fusion system 100 includes a plurality of sensor, including at least one RADAR system 102, a mono camera system 104, a stereo camera system 106, and a LiDAR system 108. In an exemplary embodiment, the at least one RADAR system 102 includes a combination of short-, medium-, and long-range RADAR systems. It should be understood that other embodiments within the scope of the present disclosure may omit one or more of these sensors, include additional sensors, or both. The RADAR system 102, a mono camera system 104, a stereo camera system 106, and a LiDAR system 108 may define at least a portion of the sensors 26.

The sensor fusion system 100 includes a primary sensor fusion module 110 and a secondary sensor fusion module 112. The secondary sensor fusion module 112 is provided to verify the primary sensor fusion module 110 using distinct algorithms from those employed in the primary sensor fusion module 110, as will be discussed in further detail below. The primary sensor fusion module 110, secondary sensor fusion module 112, and sensor fusion arbitration module 148 discussed below may collectively form the sensor fusion module 34 illustrated in FIG. 2.

The primary sensor fusion module 110 includes a raw sensor fusion module 114. The raw sensor fusion module 114 receives raw RADAR sensor data 116 from the RADAR system 102, raw mono camera data 118 from the mono camera system 104, raw stereo camera data 120 from the stereo camera system 106, and raw LiDAR sensor data 122 from the LiDAR system 108. The raw sensor fusion module 114 also receives vehicle characteristics data 124, including current vehicle state data, global navigation satellite system (GNSS) data, vehicle inertia data, and wheel encoder data. The vehicle characteristics data 124 may be received from the sensors 26 illustrated in FIG. 2.

The raw sensor fusion module 114 is programmed to perform raw sensor data fusion on the combined raw sensor data of the raw RADAR sensor data 116, raw mono camera data 118, raw stereo camera data 120, and raw LiDAR sensor data 122, e.g. at a pixel level, signal level, point-cloud level, stixel level, or feature level. The raw sensor fusion module 114 is also configured to identify and track objects in the fused data. The raw sensor fusion module 114 outputs a primary sensor fusion output 126. The primary sensor fusion output 126 includes processed data corresponding to tracked objects in the fused data from the primary sensor fusion module 110.

The secondary sensor fusion module 112 includes a first object tracking module 128 which receives the raw RADAR sensor data 116, a second object tracking module 130 which receives the raw mono camera data 118, a third object tracking module 132 which receives the raw stereo camera data 120, and a fourth object tracking module 134 which receives the raw LiDAR sensor data 122. The first object tracking module 128 is programmed to identify and track objects in the raw RADAR sensor data 116 and output a first object tracking output 136. The first object tracking module 128 may do so using a variety of known object tracking algorithms. Likewise, the second object tracking module 130, third object tracking module 132, and fourth object tracking module 134 are programmed to identify and track objects in the respective received sensor data and to output a second object tracking output 138, third object tracking output 140, and fourth object tracking output 142 respectively.

The secondary sensor fusion module 112 also includes an object data fusion module 144. The object data fusion module 144 receives the first object tracking output 136, second object tracking output 138, third object tracking output 140, and fourth object tracking output 142. The object data fusion module 144 also receives the vehicle characteristics data 124. The object data fusion module 144 is programmed to perform fusion on the tracked objects identified in the first object tracking output 136, second object tracking output 138, third object tracking output 140, and fourth object tracking output 142, respectively, e.g. using so-called track-to-track fusion. The object data fusion module 144 outputs a secondary sensor fusion output 146. The secondary sensor fusion output 146 includes processed data corresponding to tracked objects in the fused data from the secondary sensor fusion module 112.

The object data fusion module 144 functions according to a different algorithm from that of the raw sensor fusion module 114. The raw sensor fusion module 114 combines the raw data from multiple sensors before identifying and tracking objects, resulting in precise identification and tracking. The object data fusion module 144 combines tracked objects identified in a previous algorithm, resulting in a less precise identification but requiring substantially less processing resources.

The sensor fusion system 100 also includes a sensor fusion arbitration module 148. The sensor fusion arbitration module 148 receives the primary sensor fusion output 126 and the secondary sensor fusion output 146, and to output a final sensor fusion output 150. The sensor fusion arbitration module 148 is programmed to evaluate whether states of all tracked objects in the secondary sensor fusion output 146 are within a predefined range of corresponding states of tracked objects in the primary sensor fusion output 126 and vice-versa. As used here, states refer to various parameters associated with tracked objects, such as position, velocity, and acceleration. If so, i.e. the primary sensor fusion module 110 and secondary sensor fusion module 112 identify and track objects at generally the same states, then the sensor fusion arbitration module 148 outputs a final sensor fusion output 150 based on the primary sensor fusion output 126. The final sensor fusion output 150 may subsequently be used to autonomously control a vehicle, e.g. as discussed above with respect to FIG. 1.

If the sensor fusion arbitration module 148 determines that not all states for tracked objects in the secondary sensor fusion output 146 are within a predefined range of corresponding states for tracked objects in the primary sensor fusion output 126 or vice-versa, i.e. the primary sensor fusion module 110 and secondary sensor fusion module 112 identify and do not track objects at generally the same states, then the final sensor fusion output 150 includes a diagnostic signal. This diagnostic signal intensity may, for example, represent the level of disagreement of tracked object states between the primary and secondary sensor fusion modules. In response to the diagnostic signal, appropriate diagnostic action may be taken. In an exemplary embodiment, in response to the diagnostic signal, the vehicle may autonomously execute an alternative maneuver. The alternative maneuver may include, for example, a fallback command to safely stop the vehicle. Such maneuvers may be referred to as minimal risk condition maneuvers.

In the exemplary embodiment of FIG. 3, the primary sensor fusion module 110 and secondary sensor fusion module 112 are each in communication with the same set of sensors, namely the RADAR system 102, mono camera system 104, stereo camera system 106, and LiDAR system 108. However, in other considered embodiments, the primary sensor fusion module 110 may be in communication with at least one sensor which does not communicate with the secondary sensor fusion module 112, the secondary sensor fusion module 112 may be in communication with at least one sensor which does not communicate with the primary sensor fusion module 110, or both.

By providing the secondary sensor fusion module 112 as an orthogonal module with algorithms distinct from those employed in the primary sensor fusion module 110, the sensor fusion output may be validated independently from any software diagnostic conditions arising in the primary sensor fusion module 110. According to an exemplary embodiment, the secondary sensor fusion module 112 may be provided on a distinct hardware controller from the primary sensor fusion module 110, e.g. associated with a distinct microprocessor. In such an embodiment, the sensor fusion output may also be validated independently from any hardware diagnostic conditions arising in the controller associated with the primary sensor fusion module 110. However, in other considered embodiments, the secondary sensor fusion module 112 may be provided on a common hardware controller as the primary sensor fusion module 110.

While the exemplary embodiment of FIGS. 1 and 2 includes an autonomous vehicle, one skilled in the art will appreciate that sensor fusion systems according to the present disclosure may be used in conjunction with human-controlled vehicles, e.g. in conjunction with adaptive cruise control or automatic emergency braking systems.

Figure 4:
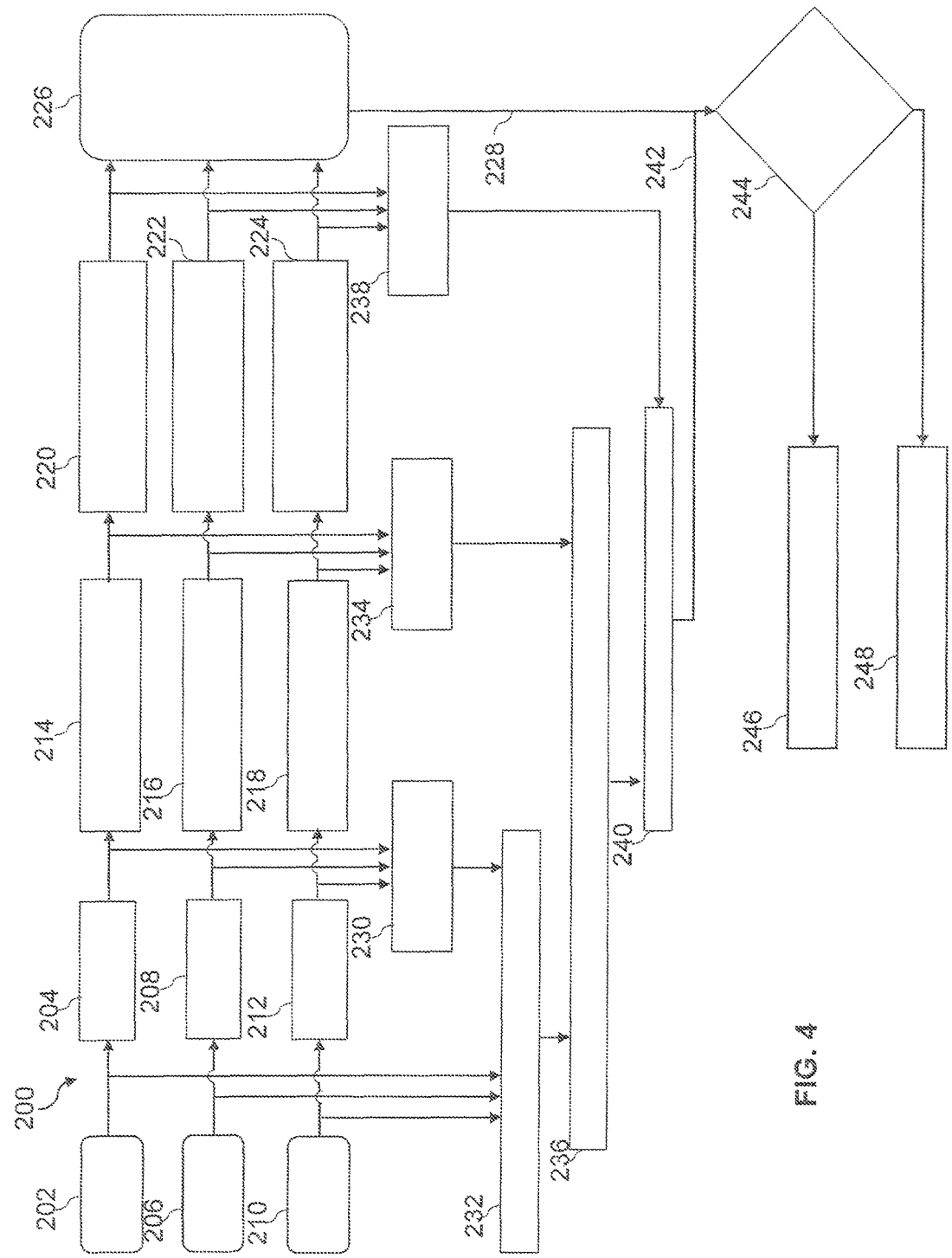
FIG. 4 is a schematic block diagram of a sensor fusion system according to a second embodiment of the present disclosure.

Referring now to FIG. 4, another exemplary embodiment of a sensor fusion system 200 according to the present disclosure is illustrated. The sensor fusion system includes a first sensor 202 configured to capture a first sensor image 204, a second sensor 206 configured to capture a second sensor image 208, and a third sensor 210 configured capture a third sensor image 212. In an exemplary embodiment, the first sensor includes an optical camera, the second sensor includes a LiDAR array, and the third sensor includes a RADAR array. However, additional sensors, other types of sensors, or both may be included in other embodiments.

In a secondary sensor fusion path, first shape features 214 are extracted from the first sensor image 204, second shape features 216 are extracted from the second sensor image 208, and third shape features 218 are extracted from the third sensor image 212. First tracked objects 220 are detected from the first shape features 214, second tracked objects 222 are detected from the second shape features 216, and third tracked objects 224 are detected from the third shape features 218. The first tracked objects 220, second tracked objects 222, and third tracked objects 224 are fused, and first estimated states 226 are generated for tracked objects among the first tracked objects 220, second tracked objects 222, and third tracked objects 224. A secondary sensor fusion output 228 is generated. The secondary sensor fusion output 228 includes the first estimated states 226.

In a primary sensor fusion path, a pixel-level fusion function 230 is performed on the first sensor image 204, second sensor image 208, and third sensor image 212. Pixel-level fusion is performed on a pixel-by-pixel (or point-cloud) basis. It generates a fused image in which information associated with each pixel (or/and point-cloud) is determined from a set of pixels or/and point-cloud in source images to improve the performance of data processing tasks such as segmentation. Primary shape features 232 are extracted from the pixel-level fusion 230 of the first sensor 202, second sensor 206, and third sensor 210.

A feature-level fusion function 234 is performed on the first shape features 214, second shape features 216, and third shape features 218. Feature-based fusion at feature level includes an extraction of objects recognized in multiple sensor data sources such as camera, lidar and radar. It includes the extraction of salient features which are depending on their environment such as pixel or/and point cloud intensities, color, edges or textures. These similar features from multiple input images are then fused together using filtering techniques. Primary tracked objects 236 are obtained from the feature-level fusion 234 and the primary shape features 232.

An object-level fusion function 238 is performed on the first tracked objects 220, second tracked objects 222, and third tracked objects 224. Object fusion involves merging information at a higher level of abstraction, combines the results from multiple algorithms to obtain a final set of fused objects. Input images are processed individually for information extraction and tracking. The obtained information (object tracks) are combined together using techniques such as Kalman filtering to reinforce common interpretation. Second estimated states 240 are obtained from the object-level fusion 238 and the primary tracked objects 236. A primary sensor fusion output 242 is generated. The primary sensor fusion output 242 includes the second estimated states 240.

A determination is made of whether a difference between the second estimated states 240 and the first estimated states 226 exceeds a calibratable threshold, as illustrated at operation 244. If the determination is negative, e.g. the primary sensor fusion output 242 and secondary sensor fusion output 228 determine generally similar states for detected objects, then the vehicle is autonomously controlled according to default behavior, as illustrated at block 246. If the determination is positive, e.g. the primary sensor fusion output 242 and secondary sensor fusion output 228 determine a difference in states for detected objects, then a diagnostic signal is generated, as illustrated at block 248. The diagnostic signal intensity may, for example, represent the level of disagreement of tracked object states between the primary and secondary sensor fusion modules. In response to the diagnostic signal, appropriate diagnostic action may be taken. In an exemplary embodiment, in response to the diagnostic signal, the vehicle may autonomously execute an alternative maneuver, e.g. as discussed above with respect to FIG. 3.

As may be seen, embodiments according to the present disclosure may enable independent validation of autonomous vehicle control commands to aid in diagnosis of software or hardware conditions in the primary control system. Embodiments according to the present disclosure may thus be more robust, increasing customer satisfaction.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be on-board as part of a vehicle computing system or be located off-board and conduct remote communication with devices on one or more vehicles.

As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An automotive vehicle comprising:
    a plurality of sensors configured to detect external features in the vicinity of the automotive vehicle;
    an actuator configured to control vehicle steering, acceleration, braking, or shifting; and
    at least one controller in electronic communication with respective sensors of the plurality of sensors and the actuator, the at least one controller being programmed with an automated driving system control algorithm and configured to automatically control the actuator based on the automated driving system control algorithm, the automated driving control system algorithm including:
        a first sensor fusion algorithm configured to receive first sensor readings from a first group of respective sensors of the plurality of sensors and provide a first sensor fusion output based on the first sensor readings, the first sensor fusion output including a first detected state of a detected object,
        a second sensor fusion algorithm configured to receive second sensor readings from a second group of respective sensors of the plurality of sensors and provide a second sensor fusion output based on the second sensor readings, the second sensor fusion output including a second detected state of the detected object, and
        a sensor fusion arbitration algorithm configured to, in response to the first detected state being outside a predetermined range of the second detected state, generate a diagnostic signal;
    wherein the at least one controller is further programmed to, in response to the diagnostic signal, control the actuator according to a fall back command.

2. The automotive vehicle of claim 1, wherein the first detected state includes a first detected position, first detected velocity, and first detected acceleration of the detected object, and wherein the second detected state includes a second detected position, second detected velocity, and second detected acceleration of the detected object.

3. The automotive vehicle of claim 1, wherein the diagnostic signal includes a parameter representative of a difference between the first detected state and the second detected state.

4. The automotive vehicle of claim 1, wherein the at least one controller includes a first controller and a second controller, the first controller being programmed with the first sensor fusion algorithm and the second controller being programmed with the second sensor fusion algorithm.

5. The automotive vehicle of claim 1, wherein the first group of respective sensors includes a respective sensor which is not among the second group of respective sensors.

6. A method of controlling a vehicle, comprising:
    providing the vehicle with a plurality of sensors configured to detect external features in the vicinity of the vehicle;
    providing the vehicle with an actuator configured to control vehicle steering, throttle, braking, or shifting;
    providing the vehicle with at least one controller in electronic communication with respective sensors of the plurality of sensors and the actuator, the at least one controller being programmed with an automated driving control system algorithm;
    receiving, via the at least one controller, first sensor readings from a first group of respective sensors of the plurality of sensors;

determining, via the at least one controller, a first sensor fusion output based on the first sensor readings, the first sensor fusion output including a first detected state of a detected object;

receiving, via the at least one controller, second sensor readings from a second group of respective sensors of the plurality of sensors;

determining, via the at least one controller, a second sensor fusion output based on the second sensor readings, the second sensor fusion output including a second detected state of a detected object;

in response to the first detected state being outside a predetermined range of the second detected state, automatically generating a diagnostic signal; and in response to the diagnostic signal, automatically controlling the actuator according to a fall back command.

7. The method of claim 6, wherein the first detected state includes a first detected position, first detected velocity, and first detected acceleration of the detected object, and wherein the second detected state includes a second detected position, second detected velocity, and second detected acceleration of the detected object.

8. The method of claim 6, wherein the diagnostic signal includes a parameter representative of a difference between the first detected state and the second detected state.

9. The method of claim 6, wherein providing the vehicle with at least one controller includes providing the vehicle with a first controller and a second controller, receiving first sensor readings is performed via the first controller, determining a first fusion output is performed via the first controller, receiving second sensor readings is performed via the second controller, and determining a second fusion output is performed via the second controller.

10. The method of claim 6, wherein the first group of respective sensors includes a respective sensor which is not among the second group of respective sensors.

11. A control system for a vehicle including at least one controller programmed to:

receive first sensor readings from a first group of sensors;

provide a first sensor fusion output based on the first sensor readings, the first sensor fusion output including a first detected state of a detected object;

receive second sensor readings from a second group of sensors;

provide a second sensor fusion output based on the second sensor readings, the second sensor fusion output including a second detected state of the detected object;

in response to the first detected state being outside a predetermined range of the second detected state, generate a diagnostic signal; and in response to the diagnostic signal, control at least one vehicle actuator according to a fall back command.

12. The control system of claim 11, wherein the first detected state includes a first detected position, first detected velocity, and first detected acceleration of the detected object, and wherein the second detected state includes a second detected position, second detected velocity, and second detected acceleration of the detected object.

13. The control system of claim 11, wherein the diagnostic signal includes a parameter representative of a difference between the first detected state and the second detected state.

14. The control system of claim 11, wherein the at least one controller is further programmed to, in response to no diagnostic signal being generated, control the at least one vehicle actuator according to an automated driving algorithm.

15. The control system of claim 11, wherein the first group of sensors includes a respective sensor which is not among the second group of sensors.

* * * * *